Figure 10:
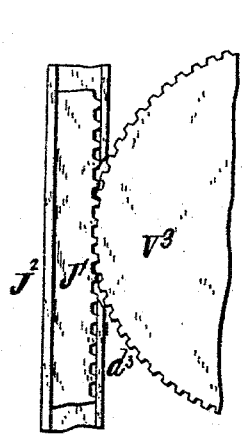

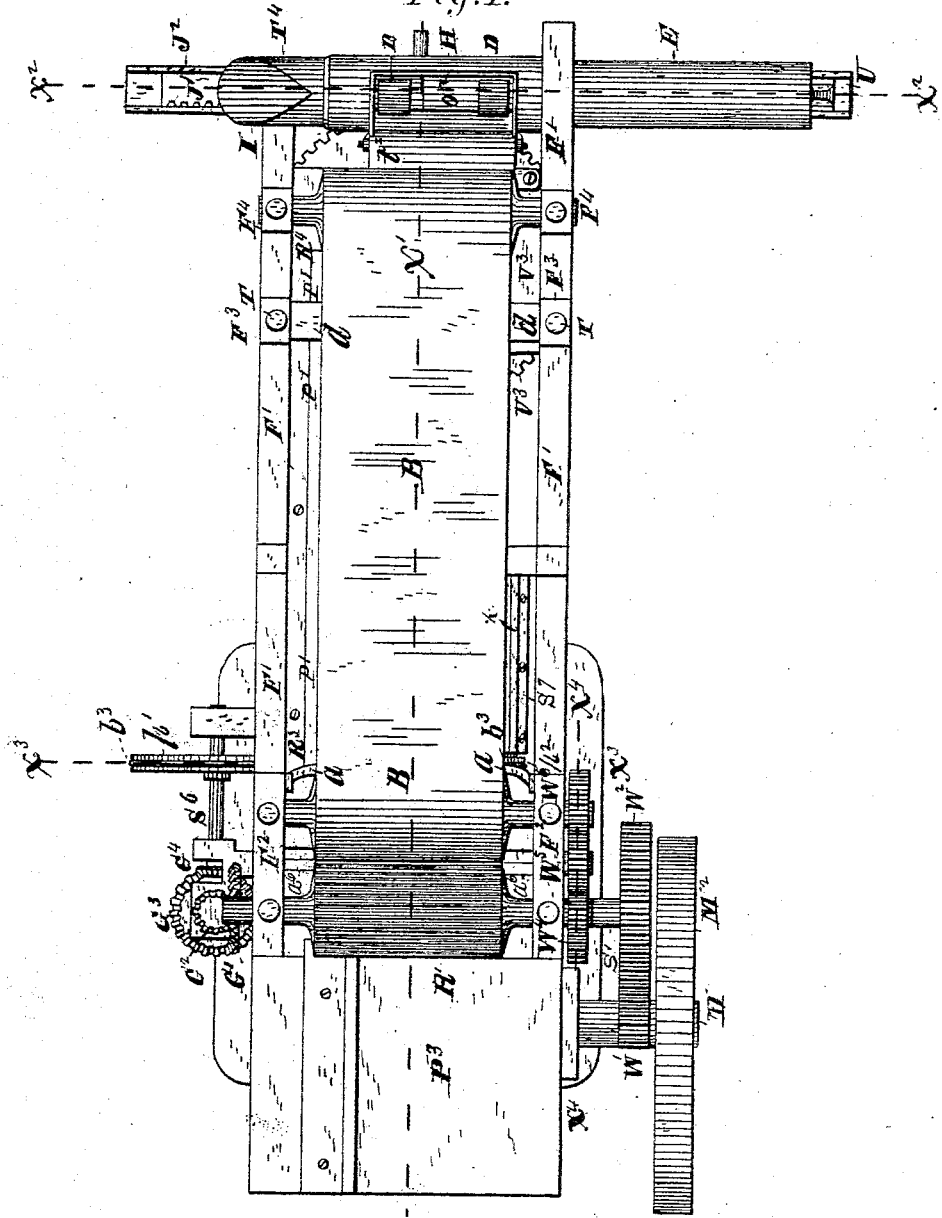

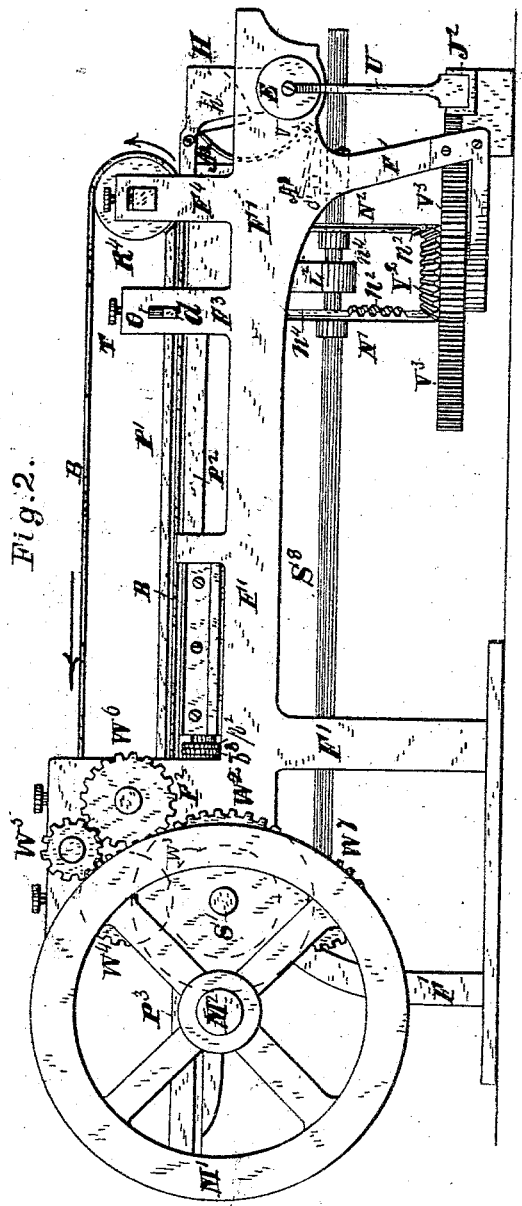

(No Model.) 6 Sheets—Sheet 3.

G. E. NORRIS & W. E. HAGAN.
MACHINE FOR MAKING MATCH BLANKS.

No. 321,444. Patented July 7, 1885.

Witnesses: Inventors:

Charles S. Brintnall  Geo. E. Norris
William E. Buell  William E. Hagan (No Model.) 6 Sheets—Sheet 4.

G. E. NORRIS & W. E. HAGAN.
MACHINE FOR MAKING MATCH BLANKS.

No. 321,444. Patented July 7, 1885.

Witnesses: Inventors:

(No Model.) 6 Sheets—Sheet 5.
G. E. NORRIS & W. E. HAGAN.
MACHINE FOR MAKING MATCH BLANKS.
No. 321,444. Patented July 7, 1885.
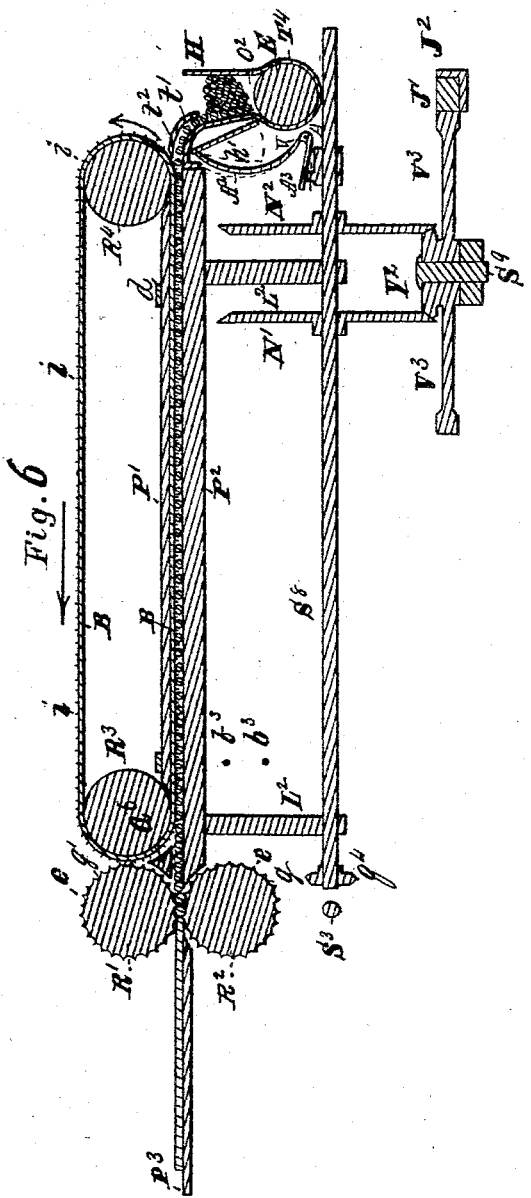
Witnesses:
Charles S. Brintnall
William C. Quell
Inventors:
Geo. E. Norris
William E. Hagan (No Model.) 6 Sheets—Sheet 6.
G. E. NORRIS & W. E. HAGAN.
MACHINE FOR MAKING MATCH BLANKS.
No. 321,444. Patented July 7, 1885.
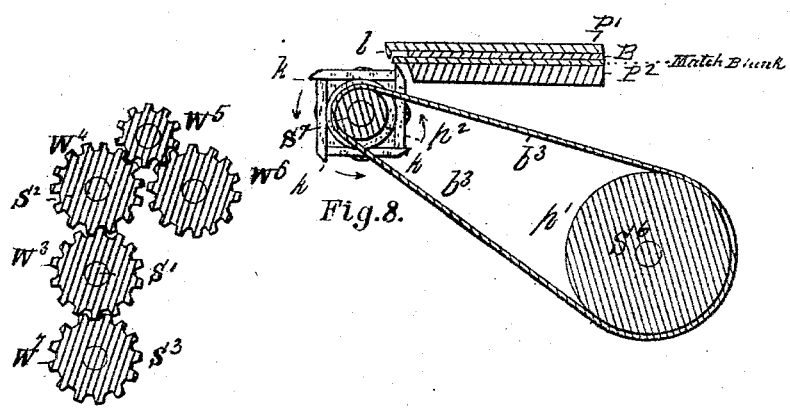
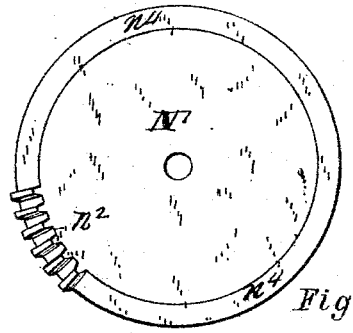
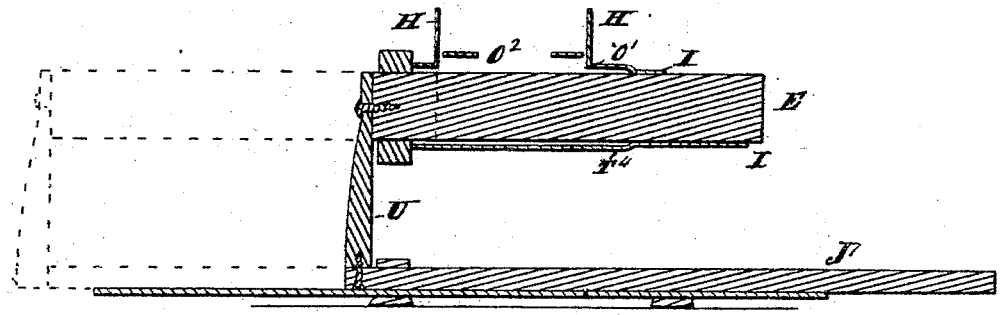
Witnesses: Charles S. Brimhall, William C. Buell
Inventors: Geo. E. Norris, William E. Hagan

UNITED STATES PATENT OFFICE.

GEORGE E. NORRIS AND WILLIAM E. HAGAN, OF TROY, NEW YORK.

MACHINE FOR MAKING MATCH-BLANKS.

SPECIFICATION forming part of Letters Patent No. 321,444, dated July 7, 1885.

Application filed November 12, 1883. (No model.)

*To all whom it may concern:*

Be it known that we, GEORGE E. NORRIS and WILLIAM E. HAGAN, of the city of Troy, county of Rensselaer and State of New York, have jointly invented a new and useful Improvement in Machines for Making Match-Blanks, of which the following is a specification.

Our invention relates to a mechanism for making and pointing match blanks or sticks, and for putting them into boxes preparatory to dipping them, and which mechanism is designed to cut the blanks from a veneer of wood.

Our invention consists, as will be more fully detailed hereinafter, in the combination of a feed-platform for guiding the veneer; two rollers that are actuated to move together and with the same speed, and each of which rollers are grooved out coincidently on their circumferential faces in a line parallel to their axes; cutting-edges between each of the rounded-out grooves, adapted to come together on the two rollers as the latter are rotated to cut and press into a rounded form the match-blanks from the veneer of wood that is passed between them.

Our invention also consists, as will be more fully detailed hereinafter, in the combination of a belt arranged to move horizontally on two pulleys and to be actuated thereon; a conveying table or platform beneath that part of the belt which moves from the cutting-rollers to the delivery end of the machine, between which belt and said plate or table the match-blanks cut by the rollers are conveyed by the movement of the belt; and an adjustable plate above the lower fold of the belt and between its pulleys adapted to press downwardly on said lower fold of the belt, and so as to facilitate the movement of the match-blanks over the table-plate by the action of the lower fold of the belt moving from the receiving end toward the delivery end of the machine.

Our invention also consists, as will be detailed and fully described hereinafter, in the combination of a hopper to receive the match-blanks moved along and over the table-plate, and to discharge them into the boxing-tube; a holder adapted to enter the side of the hopper to arrest the descent, and to retain the match-blanks from entering the boxing-tube while a charge of blanks is being boxed, and to draw out and release those detained so soon as the same are completed.

Our invention also consists, as will be subsequently fully described herein, in the combination of a boxing-tube adapted to receive match-blanks from a hopper in regulated quantities, the open end of said tube constructed to receive the open end of a match-box body when slipped on over the end of the tube; and a piston actuated to reciprocate rapidly within said tube to force the match-blanks directed therein from a hopper into said box-body on the end of the tube, and then, with a continuation of the motion in sequence, to force said filled box from off the tube.

Our invention further consists, as will hereinafter be more fully described, in the combination, with a belt having a horizontal traverse over two rollers with the lower stretch of the belt moving toward the delivery end of the machine, a guide-plate above the belt and between the rollers, a conveying-platform beneath the belt and adjacent thereto, of revolving knives arranged on a shaft and constructed to move at right angles to said belt, said knives being operated by rapid rotation to turn off and point the projecting ends of the match-blanks while the latter are between the conveying-platform and the belt with one end projecting beyond the lower plate and belt, and being rolled along by the latter over the former.

Our invention further consists in the sub-combination of the several parts of the mechanism where performing specific functions, as will be designated in the claims.

The main object and purpose of our invention are to use sheets or veneers of wood that are cut into strips at right angles to the grain, and having a width proper for the length of a match blank or splint, and from which strip, as fed into the machine endwise, the blanks are cross-cut at a proper length from the entering strip at one operation, instead of by slitting a strip longitudinally into a series of strings as fed into the machine on a line with the grain, and then severing the said strings into match-lengths by a second operation, as has been done heretofore.

Accompanying this specification, and forming a part of it, are six plates of drawings containing twelve figures illustrating our invention, with the same designation of parts by letter-reference used in all of them.

Figure 9:
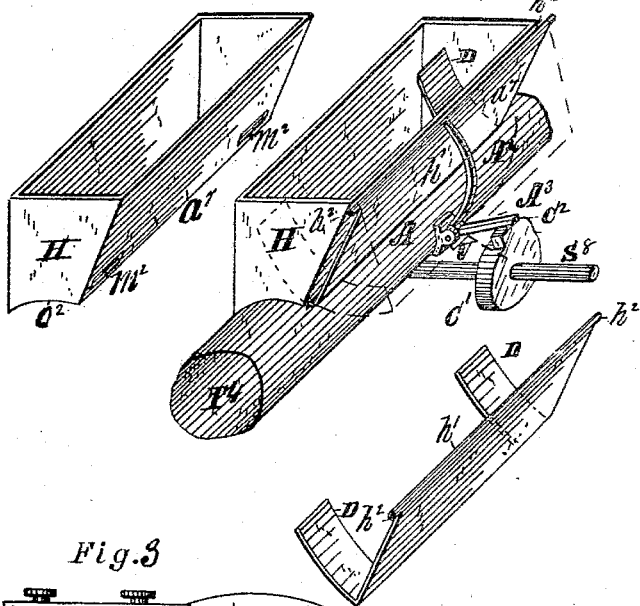
Figure 3:
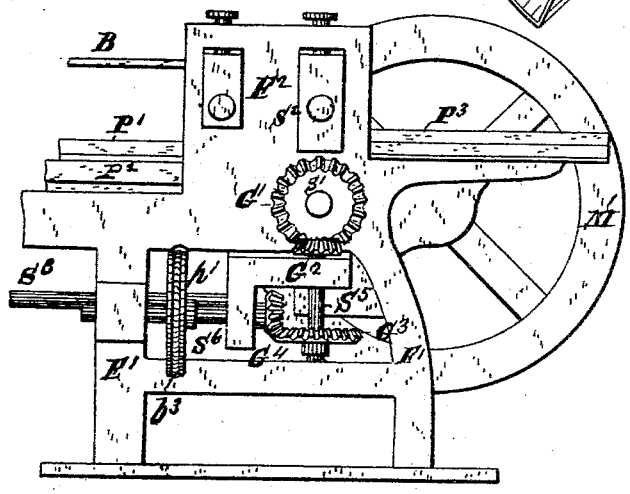
Figure 4:
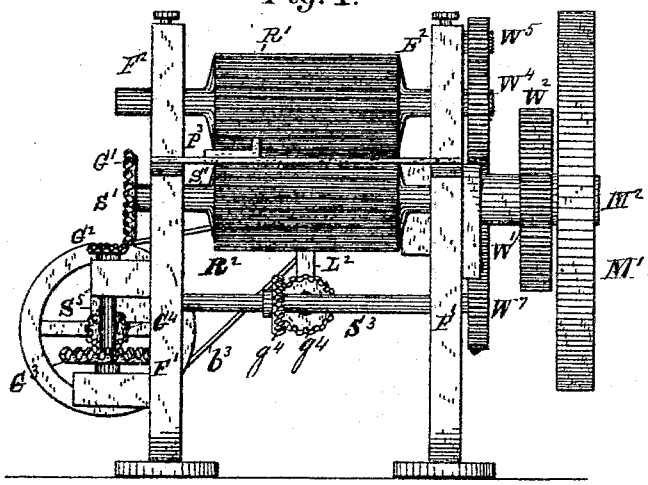
Figure 5:
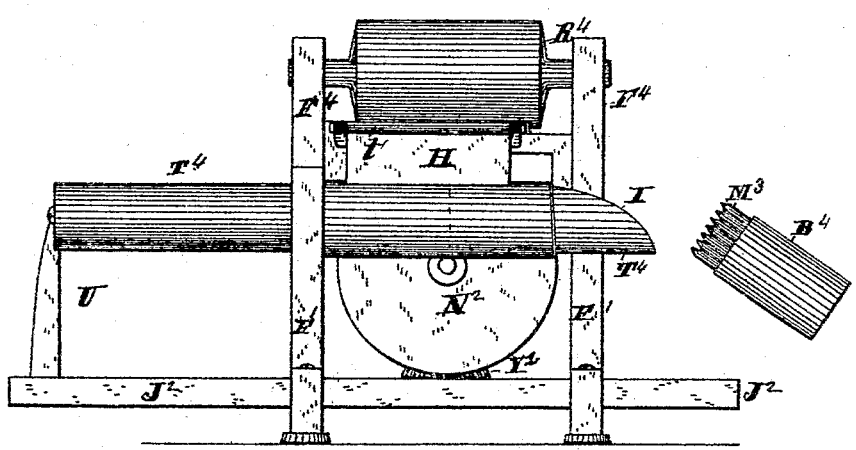

Figure 1 is a plan view of a machine containing our invention; Fig. 2, a side elevation of the same mechanism, taken on the side at which the machine receives motor power. Fig. 3 is a side elevation of the machine, taken on the side opposite to that illustrated in Fig. 2, but showing only that part of the side at the end nearest where actuating power is applied. Fig. 4 shows an end elevation of the receiving end of the machine, and Fig. 5 an end elevation of the delivery end of the machine; Fig. 6, a longitudinal vertical section taken on the line $x'\ x'$ of Fig. 1; Fig. 7, a cross-vertical section taken through the boxing-tube, piston, and piston-guide, taken on the line $x^2\ x^2$ of Fig. 1. Fig. 8 represents a cross-vertical section taken on the line $x^3\ x^3$ of Fig. 1. Fig. 9 illustrates in a perspective the hopper, the holder connected with the latter and arranged to work in and through the side of the hopper through apertures, the pivoted angular lever which operates the holder, a cam-wheel which operates the lever, and a connected part of the boxing-tube. This figure also shows in annex representation the separated holder and hopper. Fig. 10 shows a plan view of the rack and wheel which gears into the former to operate the rack and connected piston, the ends of the guide in which the rack moves, and the ends of the latter being shown as shortened and broken off, and only a diametrical part of the wheel being shown. Fig. 11 represents in vertical section the gears which connect the cutting-rollers with each other and with the master-wheel to receive actuating power taken on the line $x^4\ x^4$ of Fig. 1. It also shows a geared connection made between one of the cutting-roller gears and one of the pulleys of the match-blank conveying-belt to actuate the latter. Fig. 12 shows one of the two wheels that are made alike and located on the shaft which operates the boxing mechanism, each of which wheels being constructed with beveled segmentally-placed gears for intermittent and opposite engagement with a beveled pinion on the vertically-placed shaft of a geared wheel which is reciprocatingly rotated to perimetrically engage with the rack that moves the piston of the boxing mechanism.

The several parts of the mechanism are designated by letter-reference, and their function is explained as follows:

The letter F' indicates the frame within and on which the mechanism works, and $F^2\ F^3\ F^4$ indicate vertical studs projected from the machine-frame.

The letters R' and $R^2$ indicate two cutting and pressing rollers having their bearings in the stud $F^2$. The circumferential face of each of these rollers is grooved out, as indicated at $g$, and these grooves in the face of each roller are arranged parallel to its axis. The edges of these grooves, as designated at $e$, are made sharp, and as these rollers are actuated to move together at each revolution the edges of the grooves come to contact, so as to produce a cutting engagement when a veneer of wood is being passed through and between them. Each one of these grooves is made to correspond in size to half the circumference of the match-blank that it is designed to have them cut connectedly and press into a rounded form.

The letter $P^3$ indicates a platform along and on which the veneer is guided to enter between the rollers.

The letter M' designates the motor-wheel from which actuating power is derived, and $M^2$ its shaft, on which is constructed the geared pinion W', for transmitting power therefrom.

Instead of the wheel M', adapted to be operated by a crank, a belt-pulley may be used in place of the latter. The spur-wheel or pinion W' on the shaft $M^2$ makes a geared connection with the wheel $W^2$ on an outward extension of the shaft S' of the lower cutting-roller, $R^2$, and on the same shaft, inside of the said wheel $W^2$, there is arranged the wheel $W^3$, which latter wheel makes a geared connection with the wheel $W^4$ on the shaft $S^2$ of the upper cutting-roller, R', and said wheel $W^3$ also makes a geared connection with the wheel $W^7$ on the shaft $S^3$, to communicate motion and power to the boxing mechanism shaft, as will be subsequently described. The gear-wheels $W^3$ and $W^4$ on the cutting-roller shafts, and the gear-wheel $W^7$ on the shaft $S^3$, are of the same size and have the same number of cogs, thus moving with the same speed, and the cutting-rollers are keyed to their respective shafts so that the cutting edges $e$ come together at each revolution. At the top of the stud F, and having its shaft bearing therein, is another wheel, $W^5$, which makes a geared connection with the wheel $W^4$ of the upper cutting-roller shaft, and also with a wheel, $W^6$, on the shaft of the pulley-roller $R^3$, on which latter and the pulley-roller $R^4$ the belt B moves.

The letter P' designates a plate arranged above the belt B and between the rollers $R^3$ and $R^4$. The end of this plate, where nearest the cutting-rollers, rests on the frame F by means of ears $a\ a$, made on each side of the plate, and at its other end it attaches to a cross-bar, $d$, with the latter, and said plate P' made connectedly adjustable vertically by means of the vertical slots $o\ o$, produced in the studs $F^3$ for the ends of said plate, and the set-screws T in the end of each of the said studs.

The letter $P^2$ designates a conveying-plate arranged beneath the belt B, along and over which plate the match-blanks cut by the rollers R' and $R^2$ are rolled by the said belt toward the delivery end of the machine by the contact made with them by the moving belt B, the latter moving in the direction indicated by arrows.

The letter G' indicates a beveled gear-wheel on the shaft S' at that end of the latter which is opposite to the one from which it receives power, and this wheel G' gears into another beveled wheel, G², arranged on a vertical shaft, S⁵. On the lower end of the latter there is another beveled gear-wheel, G³, making a gear-connection with the pinion G⁴ on the horizontal shaft S⁶, on which shaft there is arranged a pulley, p'. From this pulley runs a belt, b³, to a pulley, p², on the knife-shaft S⁷, arranged behind the cutting-rollers to the side of and parallel with the adjacent edges of the plate p² and belt B, with one of its journals in a bearing in a bracket on the inside of the stud F², and its other bearing in a bracket on the inner face of the frame F'.

The letters, k k k k indicate knives made with plane-blades mounted longitudinally on the shaft S⁷.

On the edge of the plate P', which is adjacent to the knife shaft, as shown at Fig. 8, there is constructed a downwardly-projected edge flange or lip, designated at l, and which in its downward projection subtends the adjacent edge of the belt B. The severed match-blanks are carried forward from the cutting-rollers by the action of the belt, with their ends projecting beyond the edge of the plate P² and against the flange l, which position brings them in contact with the knives k, so that as the blanks are rolled along between the belt and the plate the ends are cut tapering by the knives.

To facilitate the prompt and regular movement of the match-blanks along and over the plate P², the outer surface of the belt R may be ribbed crosswise, as indicated at i in Fig. 6, although it may be used without the said ribs.

The letter H indicates a hopper constructed on the delivery end of the machine, below and at the plate P² and its extension-apron t; and h', a holder-plate that is hinged on one of its edges to the top edge of the hopper on that side of the latter which is adjacent to the machine, so that it may swing from the hopper side at that point, the hinging connection being indicated at h² h². The face of the hopper, designated at a⁷, to which this holder-plate is hinged, is beveled downwardly and inwardly, and is made with slots m² m² at the bottom of its inclined face.

The letters D designate the holder, in this instance made with two arms attached to that side of the hinged holder-plate nearest the hopper, these arms being adapted to enter the slots and produce a temporary bottom for the hopper when the holder-plate h' is forced in under and against the inwardly and downwardly beveled face of the hopper. While within the hopper the holder serves to receive and detain the match-blanks coming from off the apron-extension t' of the plate P² while the piston is moving in the boxing-tube to box the blanks therein, and when the latter is done the holder swings out from the hopper, allowing the blanks which it had detained and collected to fall through the hopper to form a part of the succeeding boxing-charge, the hopper H having an opening at its bottom, indicated at O², and shown as connecting with one made in the boxing tube T⁴.

The letter A indicates an angular lever, which at v is connected to the exterior of the boxing-tube by a pivotal attachment, so that one of its arms, A², may engage with the hinged plate-holder h', while the other arm, A³, is engaging with the cam C² in the wheel C'. As thus constructed, when the arm A² is moved upwardly by the said cam the arm A² presses against the holder-plate to swing it in under the beveled side of the hopper, and carry the holder into the hopper through the slots to form a false bottom for the latter, said holder-plate swinging back to position and drawing out the holder, when the cam releases the angular lever from its engagement with the plate h'.

While we have shown and illustrated the holder-plate made with two arms or bottom parts, and as operating in two slots made in the hopper side near the bottom thereof, the holder may consist of a single plate, and be attached to the hinged plate at its lower edge, and be used in connection with a single slot made in the hopper side long enough for its passage into and from out of the latter, the only function of the holder being to form a temporary bottom for the hopper, so as to arrest and detain the moving blanks while the boxing-piston is moving in the boxing-tube, and to release those detained when the boxing has been done at each interval at which it occurs in the operation of the mechanism.

The letter S⁸ designates a horizontal shaft having pendent arms L² L², on which shaft the wheel C' and the cam C² of the latter are operated.

The letters g⁴ g⁴ indicate engaging beveled gear-wheels, one of which is arranged on the shaft S³, to receive motor power, and the other on the end of the shaft S⁸, which communicates motion to the latter. The gears g⁴ g⁴ being of the same size, and the shaft S³ moving with the same speed as the cutting-rollers, as a sequence the shaft S⁸ will have also the same speed of revolution with that of the cutting-rollers R' and R², each making a completed rotation in the same time. As shown, the cam C² engages with the angular lever A to operate the holder D once during each revolution of the cutting-rollers. With the cutting circumferential face of the latter increased, so as to produce more blanks at each revolution, by changing the relative capacity of the gears g⁴ g⁴ to speed up the shaft S⁸ the engagements of the cam C² with the angular lever may be multiplied also.

The letter T⁴ designates the boxing-tube, and O' an opening in the top thereof communicating with the hopper-bottom opening O². The letter E indicates a piston adapted to move loosely in said tube with a rapidly-reciprocating motion, and with intervals of rest, and each reciprocation occurring immediately after a boxing-charge of match-blanks has been delivered from the hopper. The end of this tube T⁴, as indicated at I, is adapted to have an empty match-box body, B⁴, slipped on over it, so that the interior of the tube communicates with that of the box-body, and when a box-charge of match-blanks, m³, has been deposited in the tube, and the piston is moved toward the boxing end of the tube, the piston forces the match-blanks into the box-body, and then by its continued movement forces the filled box from off the tube.

The letter J' indicates a rack made with cogs upon one of its sides, and J² a guideway for the rack to move in, said guideway being cut away on one side, as shown at d³, for motor engagement with the rack.

The letter U designates a stud, which connects the piston with the rack for moving the former by the latter, and V³ indicates a gear-wheel, whose perimetral teeth are arranged to engage with said rack, and V² designates a pinion having beveled gears constructed to be secured so as to turn with the vertical pintle or shaft S⁹, on which is also arranged the wheel V³, which actuates the rack.

The letters N' and N² indicate two wheels constructed alike, and each containing a geared segment with beveled cogs, designated at N², and each wheel made with the remainder of their perimeters without gears, as indicated at n⁴. These wheels are both keyed to the shaft S⁸, with their segmentally-geared faces fronting each other, without having their toothed segments opposite, so that they will, as rotated by the shaft S⁸, engage with and gear into the pinion Y² on opposite sides of the latter, in immediate sequence to move said pinion, the wheel V³, and pintle or shaft S⁹ in reciprocating rotation, as the opposite sides of said pinion alternatingly engage with said segmental gears, and the said pinion-wheel V³, shaft S⁹, and rack remain at rest while the blank places n⁴ on said wheels N' and N² are passing said pinion without engagement. The segments of the wheels N' and N², that gear into the pinion Y², to operate therewith connectedly the wheel V³, the rack, and pinion, are arranged on the shaft S⁸ so as to engage with said pinion and move the piston forward to box the match-blanks, and to return immediately after the cam on the same shaft has been actuated to move the holder, so as to arrest the descent of match-blanks through the hopper, as before described.

The letter a⁶ designates a triangular-form guide-piece arranged between the cutting-roller R' and the belt-pulley R³, which guide-piece serves to prevent the blanks from bunching up after being cut, and before coming under the influence of the belt B. This guide a⁶ is at its ends secured oppositely in the studs F² F².

The operation of the mechanism as thus constructed and combined is as follows: A veneer of wood, of a kind suitable for making matches and having the proper thickness, is cut in strips against the grain thereof, so as to make such strips of a proper width for the length of a match, so as to be cut and pressed by the rollers. This strip of veneer, with the plate P³ as a guide, is fed into the machine so as to enter between the rollers R' and R², by which, as the latter are rotated, the intermediate veneer is cut and pressed into the proper form of rounded match-blanks. After the latter are cut and pressed by the action of the grooves and their cutting-edges on the rollers, they are, as delivered from the latter, passed under the guide-piece a⁶ so as to come within and under the influence of the belt B, which rolls them along and over the plate P². While thus moving one of the ends of each of the match-blanks and that end of each which projects beyond the edge of the belt and the edge of the said plate P² adjacently to the knife-shaft is, by the action of the rapidly revolving knives on the latter, trimmed off and pointed. After this has been done the match-blanks are continuously moved along on the plate P² to the apron t', so as to descend on the latter between it and its cover, t², to the hopper, where through the latter they fall into the boxing-tube T⁴, to be there retained until a charge for a box is received, when, by the action of the cam C² on the wheel C', and that of the angular lever A, the holder D is forced within the hopper to arrest the descent of the match-blanks into the boxing-tube, following which in quick succession, by a rapid motion, the piston forces the blanks that are within the tube into a match-box body which had been at I slipped on over the end of the tube, and then forces the filled box-body from off the tube, as before described. When the reciprocation of the tube is completed, then the holder draws out from the hopper, dropping the blanks it had detained during the movement of the piston, they falling into the boxing-tube. The delivery of the blanks to the hopper by the action of the belt is uniform with the cutting capacity of the rollers, so that the piston of the boxing-mechanism and the holder, acting once at each revolution of the rollers, would make the capacity of each box-ing-charge that cut by each revolution. With the circumferential cutting engagement made, say, three times the capacity illustrated by multiplying three times the speed of the shaft S⁸, as compared with its present geared engagement at g⁴ with that of the shaft S', the piston and holder could be actuated three times to meet such an increased capacity of the cutting-rollers at each revolution.

As the functions of the belt B would be the same, in combination with the plate P², whether said belt was actuated to move as shown or by any connection that would move it in the same manner with relation to the plate P², hence we do not limit our invention of the combined belt and plate as arranged to co-operate to their further combination with the means which we have shown as applied to move said belt.

As the boxing-tube is constructed to have a box-body slipped on over the end thereof, and made with an opening therein connecting with a hopper or other source of supply to receive match-blanks therefrom, when combined with a piston constructed to be rapidly reciprocated at intervals within said tube, to force the charge of match-blanks received in the latter into the box-body upon the end of the tube, and then force the filled box-body from off the tube, would perform all these functions in the same manner, whether the said piston was intermittently reciprocated within the tube by the mechanism shown or some other mechanism that would operate it relatively in the same manner, hence we do not limit our invention of the piston as constructed and combined with the boxing-tube as made to their further combination with the means employed to operate the said factors.

As the hopper H and combined holder D are constructed they would perform the same specific functions in the same manner whether operated by the cam $C^2$ and the angular lever A or some other mechanism which would operate them relatively in the same way; hence we do not limit our invention of the combined hopper and holder, as we construct them to co-operate, to their further combination with the means which we show as applied to actuate them.

The mechanism herein shown makes match-blanks with great rapidity. It puts a regular quantity of them into each box, and, the blanks being made with pointed ends, when placed within the boxes are in the best possible condition for dipping. It greatly reduces the cost of making matches, and it gives to the latter a uniform and finished appearance.

We are aware that it is not new to arrange two rollers, one in advance of the other, with said rollers separately actuated and the surface of said rollers each being provided with circumferentially-arranged ring-form cutting grooves and spurs, to longitudinally slit a veneer of wood into varying lengths as it is passed between them. Our invention differs from this older mechanism in that the strip is fed to the rollers with its grain parallel to the latter, and is cross-cut into blanks of the proper length at one cutting operation by means of grooves and intermediate cutting-edges that are arranged on the face of two rollers to be parallel with their axes, and with said two rollers geared together, so as to have a connected synchronous movement to bring the cutting-edges of each roller together for cutting engagement as they rotate.

We are also aware that a peg-machine has been made wherein the compression-rollers are formed with a series of cells or recesses about their faces conforming to the shape to be given to the pegs, and the rollers so adjusted as to bring the edges of the dies into direct contact to sever the pegs from the strip as it passes through the rollers. Such dies are not adapted to make match-blanks wherein the grooves in the face of the rollers are made straight with coincident cutting-edges extending for the length of the groove across the face of the rollers.

We make no claim in this application to severing-rollers formed with parallel straight grooves having coincident severing-edges arranged parallel to the axes of the rollers, and provided with annular grooves in the faces of the rollers, arranged at right angles to the axes thereof, as the same forms the subject of another application for patent filed February 13, 1885, and numbered 155,812.

Having thus described our invention, what we claim, and desire to secure by Letters Patent, is—

1. In a machine for making match blanks or splints, the rollers $R'$ and $R^2$, formed with parallel straight grooves $g'$, with coincident severing-edges $e$, extended entirely across the faces thereof, and the flat guide-plate $P^3$, all combined to operate substantially as and for the purpose stated.

2. In a machine for making match-blanks, the combination of a conveying plate or table leading from where the blanks are cut to the delivering end of the machine, a belt constructed to be moved along and over said conveying plate or table toward the delivery end of the machine, an adjustable plate above the lower stretch of said belt and between the rollers $R^3$ and $R^4$, a cross-bar on said adjustable plate and attached thereto near the delivery end of the belt, slots in vertical studs on the machine-frame to receive the ends of the said cross-bar, and set-screws in the ends of the studs adapted to engage with said cross-bar at its ends, as and for the purposes herein set forth.

3. The combination of the belt B, the lower conveying-plate, $P^2$, the upper adjustable plate, $P'$, and the shaft $S^7$, provided with knives $k$, arranged behind the cutting-rollers to the side of and parallel with the adjacent edges of the plate $P^2$ and belt B, substantially as described, and for the purpose set forth.

4. In a mechanism for boxing match-blanks, the combination of a hopper open at the bottom and thereat in communication with a boxing-tube, and a holder constructed and actuated to swing into said hopper through a slotted passage-way in the side thereof, to arrest the descent, and to detain the match-blanks falling into the hopper when the boxing mechanism is boxing a charge of match-blanks, and then swing from out the hopper to release the detained blanks, to allow them to descend into the boxing-tube, substantially in the manner herein shown and described.

5. In a machine for boxing match-blanks, the combination of the hopper H, made with the bottom opening, $O^3$, and a side passage for the holder, the holder D, with its holder-plate hinged at its top to the top of the beveled side of the hopper, and said holder adapted to enter the hopper at its side, and the angular lever A, adapted to engage with the said holder-plate and with the cam C², substantially as and for the purposes herein set forth.

6. In a machine for boxing match-blanks, the combination of a hopper having an open bottom, a holder constructed and adapted to arrest and detain the passage of match-blanks through said hopper at mechanically-arranged periods of operation, and, in sequence, to release the said detained blanks, a boxing-tube connected therewith to receive match-blanks from said hopper, and constructed to have a match-box body inserted on and over its open end, a piston constructed to be rapidly reciprocated within said tube to force the match-blanks therein into the box-body on the end of the tube and the filled box-body from off the latter, in the manner herein shown and described.

7. The combination of the wheels N' and N², arranged on the same shaft for receiving motor power, and each constructed with the segmental beveled gears $n^2$, and the perimetral spaces $n^4$ without gears, the pinion Y², made with bevel-gears, the gear-wheel V³, arranged on the same vertical shaft as said pinion, the rack-guide J², the rack J', adapted to engage with said wheel V³, the stud U on the end of the rack, the piston E at one of its ends attached to said stud, and with the said parts arranged and constructed to operate substantially as and for the purposes set forth.

8. In a machine for making match-blanks, the combination of the rollers R' and R², each constructed with the grooves $g'$, the coincident cutting-edges $e$, and adapted to be actuated together by a geared connection, the conveying table or plate P², and the belt B, adapted and arranged to be moved over, along, and adjacently to said plate or table from or in the immediate vicinity of the cutting-rollers, toward or to the delivery end of the machine, as and for the purposes herein set forth.

9. In a machine for making match-blanks, the combination of the rollers R' and R², each constructed with the grooves $g'$, and the intermediate cutting coincident edges, $e$, and adapted to be actuated together by a geared connection, the conveying table or plate P², and the belt B, adapted and arranged to be moved over and along adjacently to said plate or table from or in the immediate vicinity of said cutting-rollers toward or to the delivery end of the machine, and the adjustable plate P', above said belt, when moving toward the delivery end of the machine, and in contact with said belt, as and for the purposes herein set forth.

10. In a machine for making and pointing match-blanks, the combination of the beveled gear-wheel G' on the motor-shaft, the bevel-geared pinion G², and bevel-geared wheel G³ on the same vertical shaft, and receiving motion and power from the engagement of said pinion G² with the wheel G', the bevel-geared pinion G⁴ on the shaft S⁶, connecting with said wheel G³, the pulley $p'$ on said shaft S⁶, the pulley $p^2$ on the knife-shaft S⁷, and the belt $b^3$, connecting said pulleys, substantially as and for the purposes herein described and set forth.

Signed at Troy, New York, this 8th day of November, 1883.

GEO. E. NORRIS.
WILLIAM E. HAGAN.

Witnesses:
CHARLES S. BRINTNALL,
WILLIAM C. BUELL.